J. W. BEELER.
AUTOMATIC BRAKE MECHANISM.
APPLICATION FILED AUG. 3, 1914.
1,125,638.
Patented Jan. 19, 1915.
2 SHEETS—SHEET 1.
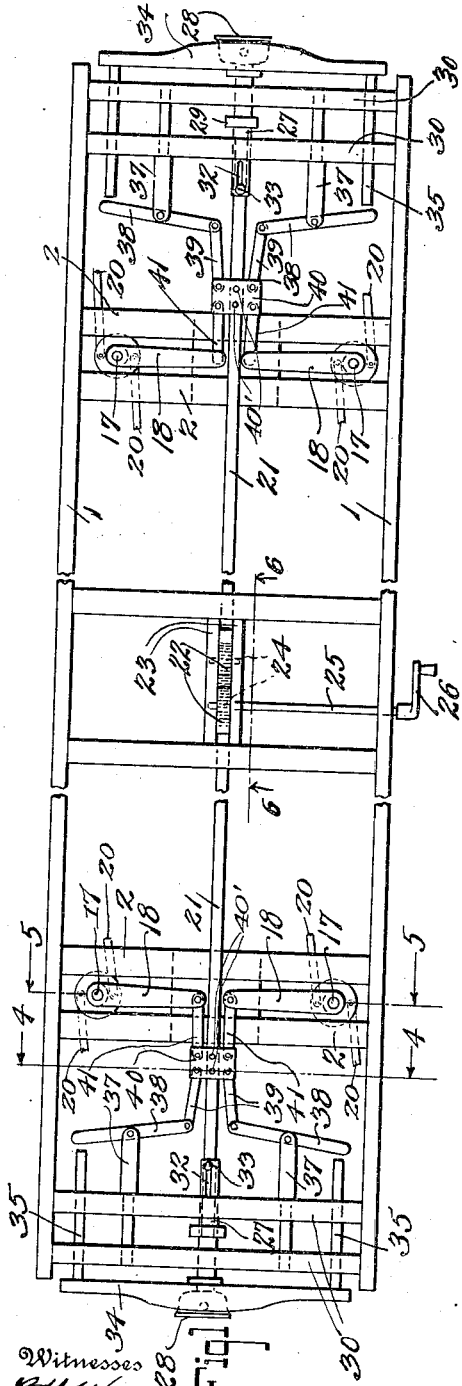
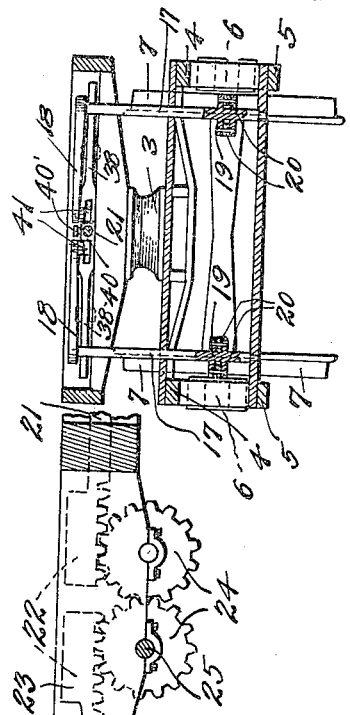
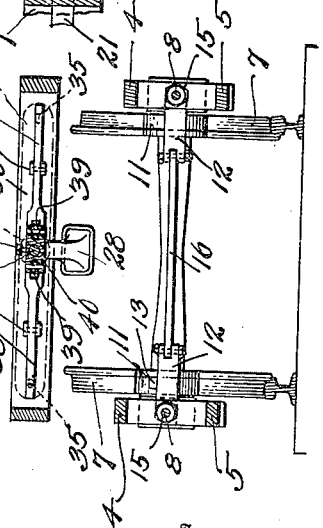
Witnesses
C. H. Wagner
D. K. Partello.
Inventor
James W. Beeler
By Robb & Robb
Attorneys

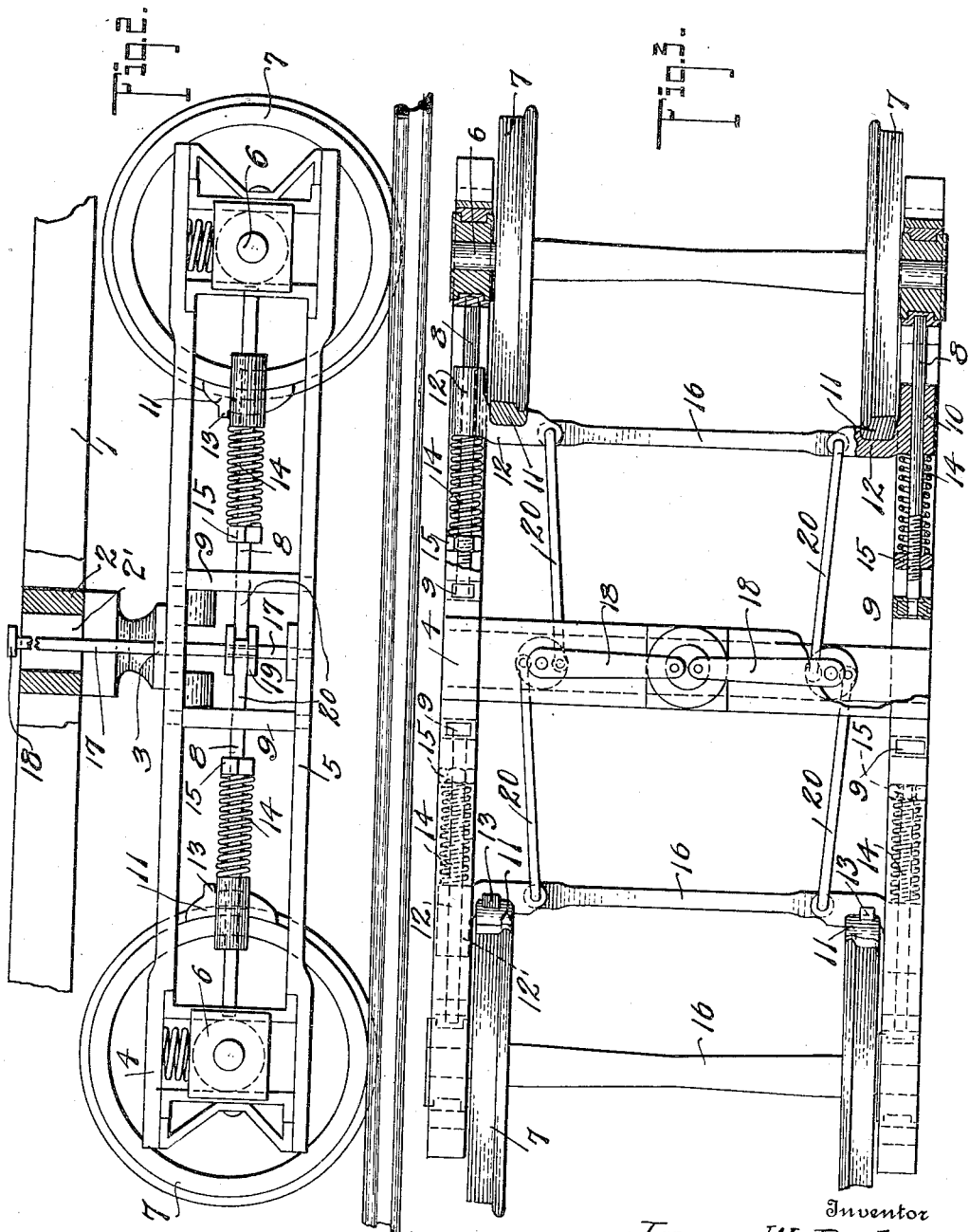

UNITED STATES PATENT OFFICE.

JAMES W. BEELER, OF MAYNARDSVILLE, TENNESSEE.

AUTOMATIC BRAKE MECHANISM.

1,125,638. Specification of Letters Patent. Patented Jan. 19, 1915.

Application filed August 3, 1914. Serial No. 854,793.

*To all whom it may concern:*

Be it known that I, JAMES W. BEELER, a citizen of the United States, residing at Maynardsville, in the county of Union and State of Tennessee, have invented certain new and useful Improvements in Automatic Brake Mechanism, of which the following is a specification.

This invention relates to improvements in brakes of the automatic type and the object in view is the provision of means for insuring effective application of brakes subject to means insuring release thereof upon moving the vehicle to which the brakes are applied either forwardly or rearwardly.

With this and other objects in view, as will in part hereinafter become apparent and in part be stated, the invention comprises automatically set brakes, links and levers for releasing the brakes, draft means adapted to be moved forwardly and rearwardly, and means of connection between the draft means and the levers for effecting release of the brakes on either forward or rearward movement of the draft means.

The invention further comprises spring set brakes, links connected thereto, levers pivotally engaging the links for releasing the brakes whenever the levers are moved pivotally in either direction, a shiftably mounted draw bar connected to said levers, and means shifting the draw bar incident to application of power thereto.

The invention further comprises certain other combinations, constructions, and arrangements of parts as will be hereinafter specified and claimed.

In the accompanying drawing, Figure 1 is a top plan view of a sub-frame of a railway car, having applied thereto features of the present invention, the brakes being omitted. Fig. 2 is a view in side elevation of one of the trucks and a fragment of the sub-frame, parts being seen in section, and the parts being seen on an enlarged scale. Fig. 3 is a plan view of the truck seen in Fig. 2, parts being broken away for illustrating other parts in horizontal section. Figs. 4 and 5 are transverse vertical sections taken respectively on the planes indicated by lines 4—4, and 5—5 of Fig. 1, the truck being shown. Fig. 6 is an enlarged detail longitudinal section taken approximately on the plane indicated by line 6—6 of Fig. 1. Fig. 7 is a fragmentary enlarged sectional view of the beam sleeve showing more clearly the elements connected thereto.

Referring to the drawing by numerals, 1 indicates a sub-frame of a railway car having the usual body bolster 2 sustained by the usual truck bolster 3 of a truck 4 at each end. Each truck 4 consists of the usual side frames 5 having appropriate pedestals engaging axles 6 sustained by carrying wheels 7. Arranged in each side frame 5 are horizontal guiding rods 8, 8, one disposed near each end portion of the side frame and being fixed at its outer end to the respective pedestal and at its inner end to an upright bar 9 fixed to the horizontal bars of the side frame. Each rod 8 may be otherwise mounted as found preferable, so long as rigidly sustained in the side frame. A cylindrical sleeve 10 surrounds each rod 8 and appropriately detachably connected to the sleeve 10 is the usual brake shoe 11 disposed to engage the periphery of the respective wheel 7. The connection between the shoe 11 and the respective sleeve 10 may obviously assume any of various embodiments, one preferred form consisting of a laterally extending plate 12 formed integral with sleeve 10 and disposed for receiving a shoe 11 between itself and the wheel 7, the shoe being suspended on a lug 13 projecting from the shoe and overhanging plate 12. A helical spring 14 surrounds each shaft 8 and has its outer end pressing against the inner end of the sleeve for maintaining the respective shoe 11 normally in braking relation to the wheel 7. The inner end of each spring 14 is preferably engaged by a tensioning nut 15 threaded onto shaft 8 for enabling adjustment of the nut longitudinally of the shaft for varying the tension of the spring 14. As there is a sleeve 10 for each wheel 7, the sleeves for a given pair of wheels may be considered a pair of sleeves, and to facilitate cooperative action the plates 12 of each pair of sleeves are preferably connected by a cross bar or transom 16. The use of this bar is of course optional but preferable since it insures more nearly exact uniformity in the action of the brakes of a given pair.

Each bolster 2 is made up of a pair of cross sills spaced longitudinally of the frame, as indicated at 2'. Near each end of each bolster 3, a vertically disposed shaft 17 extends from a point approximately on the horizontal plane of the lowermost portion of the side frames upwardly through the truck bolster and on upwardly through the space 2' and the lever 18 is fixed to the upper end at each of the rods 17 and extends therefrom inwardly toward the central line of the sub-frame. Fixed to each shaft 17 are spaced disks 19 to which are pivoted near the peripheries thereof, links 20, 20 one extending in a general direction forwardly longitudinally of the truck and the other extending in the same general direction rearwardly and one engaging pivotally one of the plates 12 of one pair and the other pivotally engaging a corresponding plate 12 of the other pair so that whenever the levers 18 are swung toward the left the disks 19 will be revolved and the shafts 20 caused to move longitudinally in a direction away from the wheels 7 whereby the plates 12 with their engaged brake shoes 11 and connected parts may be readily moved to the brake releasing position.

It will of course be understood by those skilled in the art to which this invention refers that the counterpart of the truck illustrated in Fig. 3, which is in the form adapted for the left end of the car illustrated in Fig. 1, is connected to the right end of the car in a reverse position to that of the left end truck so that the levers 18 will be properly actuated to effect releasing action of the brakes through the instrumentality of the divided draft beam.

It is to be noted that the disks 19 function merely as cranks for actuating links 20 and any appropriate mechanical equivalent may be utilized as such cranks.

Since each truck is a duplicate of the other, only one is illustrated and described in detail. Extending longitudinally centrally of the sub-frame is a draft beam 21 which is divided centrally and has juxtaposed end portions at the point of division, each fixed to a longitudinally shiftable rack 22, said end portions being slidingly mounted in a guiding frame 23 fixed to the sub-frame and the racks meshing respectively with gear wheels 24 which are journaled in the frame 23 and disposed to intermesh so that longitudinal movement of either of the racks 22 in either direction will impart similar movement to the opposing rack in the opposite direction. A journal or shaft of one of the wheels 24 is extended, as indicated at 25, and projecting beyond one side of the sub-frame in position for being engaged by a crank or other tool 26 for facilitating manual rotation of the shaft for enabling manual release of the brakes when desired in a manner which will hereinafter become apparent. Each section of draft beam 21 extends throughout its respective portion of the sub-frame, through the body bolster thereof and to a point adjacent the end of the sub-frame and is there engaged by a telescoping sleeve 27 which incloses the end portion of the respective section of beam 21 and serves as a draw bar being provided at its outer end with the usual coupler head 28. Sleeve 27 is provided with an annular flange or shoulder 29 between the terminal cross sills 30 of the sub-frame so that buffing strains may be taken up by one of the cross sills 30 and not delivered throughout the beam 21. Each sleeve 27 is provided with a longitudinal slot 32 through which extends a pin 33 fixed to the respective section of beam 21 so that each sleeve 27 is free for a limited amount of longitudinal movement. A cross head 34 is arranged at each end of the sub-frame and carries rods or plungers 35 fixed to the respective cross head and extending longitudinally of the sub-frame through sills 30. Fulcrum bars 37, 37 are fixed to sills 30 between the ends and central portions thereof and a lever 38 is pivoted approximately midway of its length to the respective bar 37 and is disposed with its outer free end arranged in line with the respective plunger 35 so as to be struck thereby when the cross head 34 is moved inwardly whereby the inner ends of levers 38 are adapted to be moved with respect to the sub-frame longitudinally outward. The inner end of each lever 38 is pivoted to a link 39 which in turn is pivoted to a sleeve 40, the said sleeve being engaged by links 41, 41, extending to and pivotally engaging the respective levers 18 at the end of the sub-frame, said sleeve also being attached to the beam 21 by set screws 40'.

In operation, the brakes remain applied when not forcibly released, and are automatically applied whenever free for such action, so that the maximum degree of safety is insured, since by no possible accident tending to interrupt the motion of the train can efficiency in the brake control be destroyed. Describing the action of the left hand truck rigging, when subjecting the car to draft, the pull upon coupler 28 first moves the sleeve 27 to the position indicated in Fig. 1 if it is not already in that position, where the pin 33 engages the rear or inner end wall of slot 32, and a further movement of the coupler head 28 effects longitudinal movement of the links 41 which results in swinging the levers 18 and shifting links 20 longitudinally; thus releasing all of the brakes on the respective truck and at the same time the longitudinal pull on the respective section of beam 21 has, through the racks 22 and pinions 24, imparted a longitudinal thrust to the other section of the draft beam and thereby moved the other set of levers 18 and correspondingly released the brakes of the other trucks. As soon as the draft on beam 21 is relieved, as when the engineer is bringing his train to a stop, the release of levers 18 will allow the springs 14 to act and to apply the brake. Obviously the application will be at a rate and with an effectiveness proportioned to the degree of release of draft pressure on coupler head 28 so that if the brakes are to be applied slowly the engineer merely slows down his locomotive at a rate gradually relieving the draft strain on the draft rigging of the car. An emergency application may be attained merely by stopping the locomotive suddenly.

When it is desirable to back the car, the backing pressure is exerted on the cross head 34 which moves longitudinally of the subframe into contact with the outer cross sill 30 and then the car is in condition for being pushed since the movement of the cross head 34 will have caused the plungers 35 to engage and swing levers 38 in a direction drawing links 39 longitudinally of the frame with the resulting similar movement of links 41 and a consequential brake releasing movement of levers 18. The movement of links 39 will have at the same time effected a movement of sleeve 40 and respective section of beam 21 with a corresponding resulting movement of the other section of the beam, and a consequent release of the other brakes. The length and relative location of slot 32 is designedly adapted for accomplishing these results.

When the car is standing on a track detached and it is desirable to move the same by levers or other devices without the use of a locomotive or other like power mechanism, the crank 26 is employed and shaft 25 revolved for moving the sections of draft beam 21 to the releasing position. Without this attachment the car would be locked in position on the track and could not be moved manually as is necessary occasionally when it is desirable to shift a car a few feet and a yard engine or other locomotive is inaccessible.

Having thus described my invention, what I claim as new is:

1. In an automatic brake mechanism, the combination with a truck frame having supporting wheels, of guiding rods carried by the frame, a sleeve slidingly mounted on each rod adjacent the respective wheels, a spring pressing the sleeve in a general direction toward the axis of the wheel, a brake shoe sustained and arranged to be actuated by the sleeve, and draft rigging actuated means for moving the sleeve against the tension of the spring.

2. In an automatic brake mechanism, the combination with a truck having a frame, wheels extending from the same, of a slidingly mounted sleeve carried by the frame for each of the wheels, a spring engaging the sleeve and pressing the same toward the axis of the wheel, a brake shoe disposed to be pressed by the sleeve toward a braking engagement with the wheel, links engaging the several sleeves, vertically disposed rods journaled in the frame, crank connections between the rods and links, and means for oscillating the rods relative to movements of the truck.

3. In a brake mechanism, the combination with a sub-frame, a truck carrying the same, of movably mounted brake shoe sustaining means carried by the truck, cushioning means pressing said sustaining means toward a position of brake application, means for releasing the brake application, a vertically disposed rock shaft journaled in the truck frame and extending upwardly therefrom through the truck and body bolsters, and means carried by the sub-frame for oscillating said shaft.

4. In a brake mechanism, the combination with a sub-frame, a truck carrying the same, of movably mounted brake shoe sustaining means carried by the truck, cushioning means pressing said sustaining means toward a position of brake application, means for releasing the brake application, a vertically disposed rock shaft connected to actuate the releasing means and journaled in the truck frame and extending upwardly therefrom through the truck and body bolsters, a lever connected to the shaft, and draft and buffing stress actuated means engaging said lever for oscillating said shaft.

5. In brake mechanism, the combination with a truck frame and sub-frame sustained thereby, of brakes for the truck, means for automatically applying the brakes, a shaft for releasing the brake, a lever connected with the shaft, a draft beam sustained by the sub-frame, a link pivotally connecting the lever to the draft beam, a coupler head movably connected to the draft beam, the draft beam being movably mounted for being subjected to longitudinal movement under stress of draft from the coupler head, a cross head sustained by the sub-frame, and means actuated thereby under buffing stresses for moving the draft beam longitudinally.

6. In brake mechanism, the combination with a truck frame and sub-frame sustained thereby, of brakes for the truck, means for automatically applying the brakes, a shaft for releasing the brake, a lever connected with the shaft, a draft beam sustained by the sub-frame, a link pivotally connecting the lever to the draft beam, a coupler head movably connected to the draft beam, the draft beam being movably mounted for being subjected to longitudinal movement under stress of draft from the coupler head, a cross head sustained by the sub-frame, a plunger carried by the cross head, a lever in the path of the plunger, and a link connecting the lever to the draft beam for effecting movement of the draft beam under buffing stress delivered to the cross head.

7. In brake mechanism, the combination with a truck frame and sub-frame sustained thereby, of brakes for the truck, means for automatically applying the brakes, a shaft for releasing the brake, a lever connected with the shaft, a draft beam sustained by the sub-frame, a link pivotally connecting the lever to the draft beam, a coupler head movably connected to the draft beam, the draft beam being movably mounted for being subjected to longitudinal movement under stress of draft from the coupler head, a cross head sustained by the sub-frame, plungers longitudinally reciprocally mounted in the sub-frame and connected to the cross head for being reciprocated when the cross head is subjected to buffing stresses, levers pivotally sustained by the sub-frame with free ends extending into the paths of the plungers for being struck and actuated by the plungers, and links connecting the levers to the draft beam for moving the same.

8. In automatic brake mechanism, the combination with a sub-frame, of automatic brake control means carried by each end portion thereof, a divided draft beam carried by the sub-frame and connected to said controlling means for actuating the same, and gearing connecting the sections of the draft beam for shifting one relative to the other when the second section of draft beam section is shifted.

9. In automatic brake mechanism, the combination with a sub-frame, of automatic brake control means carried by each end portion thereof, a divided draft beam carried by the sub-frame and connected to said controlling means for actuating the same, gearing connecting the sections of the draft beam for shifting one relative to the other when the second section of draft beam is shifted, and manual means for the sections of the draft beam.

In testimony whereof I affix my signature in presence of two witnesses.

JAMES W. BEELER.

Witnesses:
ROGERS BRICK,
M. A. BEELER.

Copies of this patent may be obtained for five cents each, by addressing the "Commissioner of Patents, Washington, D. C."